April 4, 1961 G. HINDERER ET AL 2,977,986
SINGLE-HANDLED VALVE
Filed Feb. 4, 1957 4 Sheets-Sheet 1
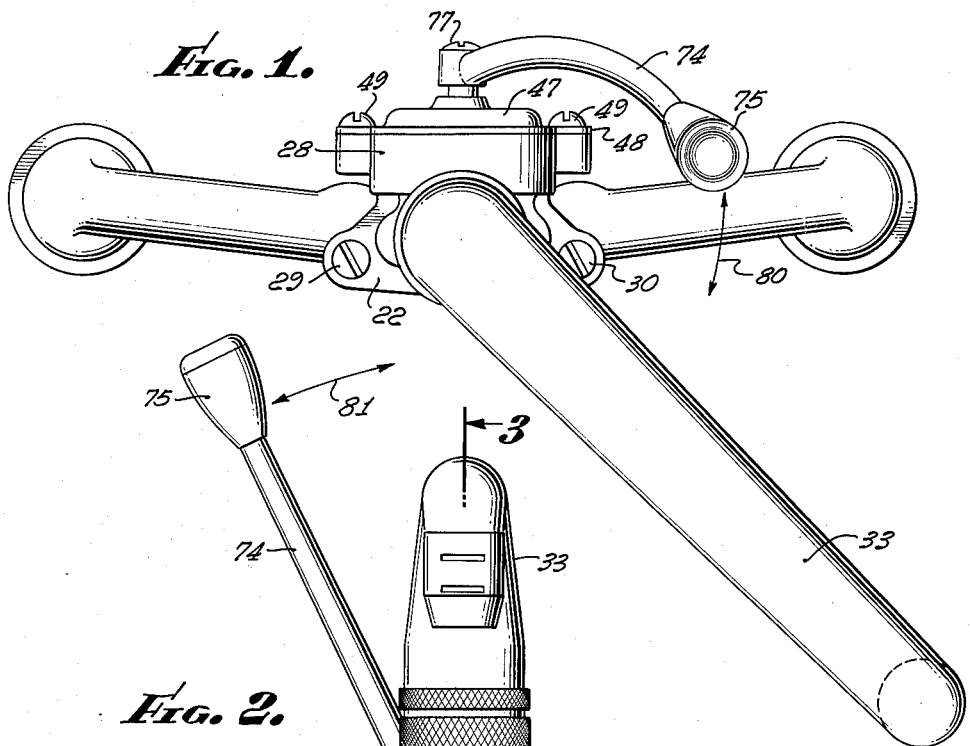
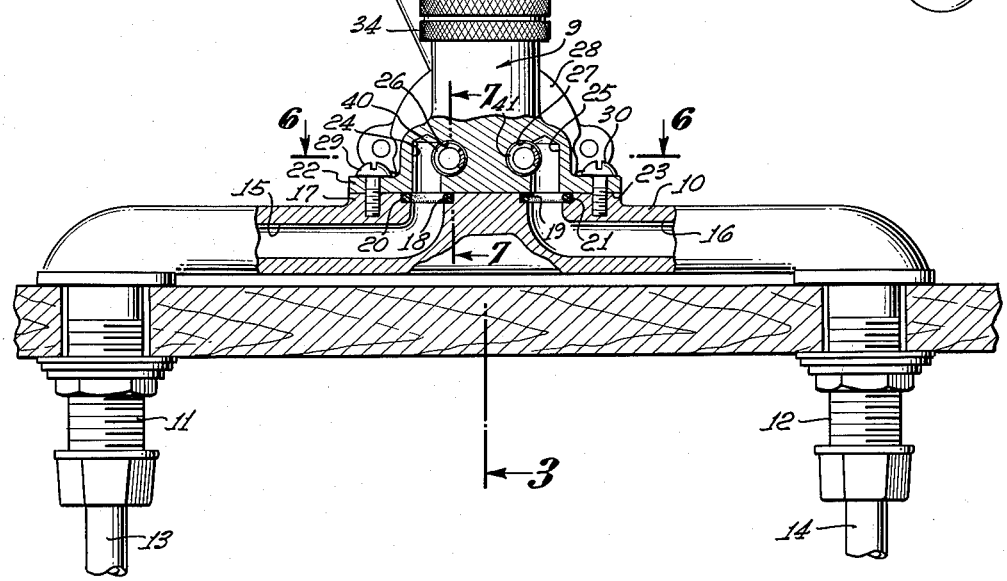
INVENTOR.
GOTTLOB HINDERER,
BY JOHN K. LYON
*Flam and Flam*
ATTORNEYS.

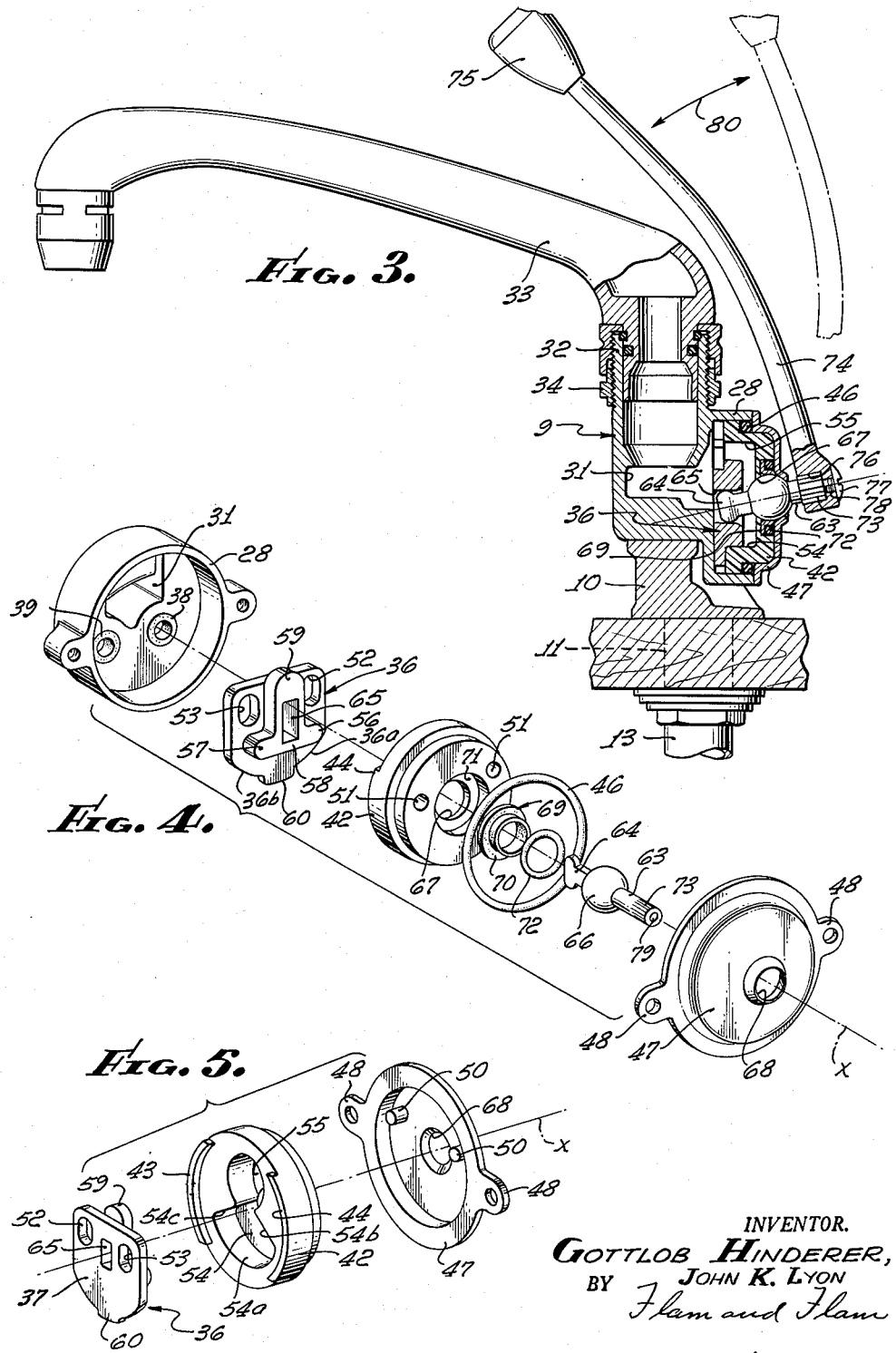

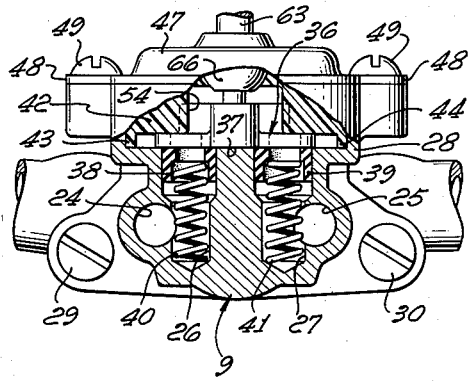
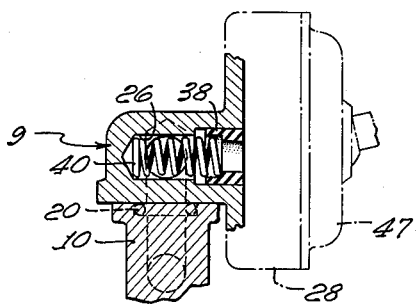
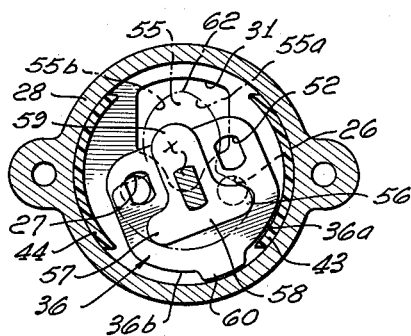
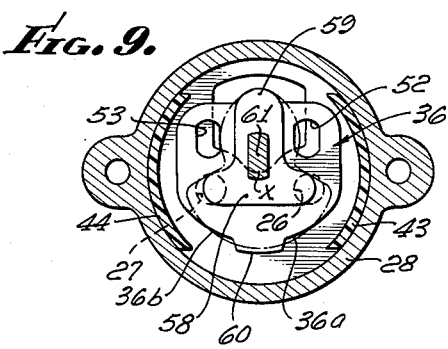
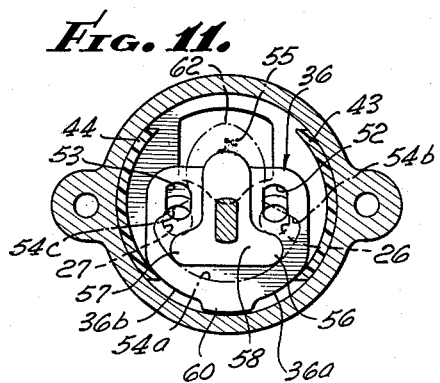
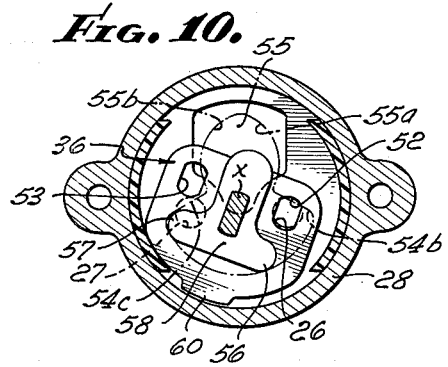

April 4, 1961

G. HINDERER ET AL 2,977,986

SINGLE-HANDLED VALVE

Filed Feb. 4, 1957

INVENTOR.
GOTTLOB HINDERER,
JOHN K. LYON
BY Flam and Flam
ATTORNEYS.

United States Patent Office 2,977,986
Patented Apr. 4, 1961

2,977,986

SINGLE-HANDLED VALVE

Gottlob Hinderer, La Canada, and John K. Lyon, Los Angeles, Calif., assignors to Price-Pfister Brass Mfg. Co., Los Angeles, Calif., a corporation of California Filed Feb. 4, 1957, Ser. No. 637,914

23 Claims. (Cl. 137—625.17)

This invention relates to a single handle volume and proportion valve, commonly called a mixing valve, and which is especially useful for combined hot and cold water faucets.

A great many valves of various types have been proposed, and very few have been commercially successful. Even the commercially successful valves are so high-priced (due to various complications) that they are luxury items.

The essential problems in this art, among others, are how to avoid (1) careful machining operations, (2) using numerous parts, and (3) using complicated or bulky mechanisms.

The primary object of this invention is to provide a mixing valve so simple in construction that it can be manufactured at a price actually competitive with ordinary faucet valves. The valve incorporates a simple flat valve plate that slides across a doubly ported flat seat. A simple mechanism causes translation of the plate to adjust volume and rotation of the plate about axes normal to the seat for proportioning the flow through the respective ports.

A typical prior mixing valve utilizes rotary movement of a plug or sleeve to adjust one of the variables (volume or proportion) and axial movement to adjust the other variable. There are, hence, an infinite number of positions corresponding to shut-off. Thus, if axial movement determines volume and angular movement determines proportion, the valve may be moved to an extreme axial position whatever may be the proportion setting. Thus, the valve may be "off" at —30°, corresponding to cold, or +30°, corresponding to hot, or any other intermediate position. Thus, by moving the plug axially, there is no assurance what proportions will be effected, and adjusting the proportion requires a different type of movement. While a scale or marking may be provided for the neutral proportion setting, reference to a marking may be tedious, but even this does not overcome the requirement of the types of movement. All this makes initial and other adjustments difficult and time-consuming.

Another object of this invention is to provide a mixing valve so designed that when it is in the "off" position, its handle is in one, and only one, position, corresponding to neutral or even proportions, and so designed that its handle moves easily and uniformly within a triangle to effect both volume and proportion adjustments. Accordingly, by virtue of the definite "off" position, there is a definite reference quickly, and soon subconsciously, understood by the user. Since both adjustments are accomplished by an integrated movement, the valve is adjusted to the desired position without fumbling or testing. Thus, by following one leg of the triangle from the neutral "off" apex, the volume increases while only hot water flows through the valve. By following the other leg, the volume increases while only cold water flows through the valve. By following an intermediate path, the volume increases while a corresponding proportion of hot and cold water flows. The path of movement corresponding to the proportion can readily be chosen since there is a reference "off" position, and volume and proportion are simultaneously determined in a simple movement of the handle. Of importance is the fact that this is made possible in a very simple valve structure.

In order to accomplish the foregoing objects, a lever movable on a universal or ball joint is provided. The triangular limits are determined by a simple cam with which the valve plate cooperates.

Another object of this invention is to provide a simple mixing valve of this character having a long life, and in which simple but effective seals may be provided.

Another object of this invention is to provide a valve of this character that is readily assembled and repaired.

Still another object of this invention is to provide a valve structure of this character that is compact such that it may be incorporated in various simple fixture designs for sink, lavatory, bathtub, shower or any other installation.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a top plan view of a faucet construction incorporating the present invention;

Figure 2 is a front elevation of the faucet construction shown in Fig. 1, a portion of the apparatus being broken away and shown in section;

Fig. 3 is a vertical sectional view taken along a plane indicated by line 3—3 of Fig. 2, there being illustrated in phantom lines a different position of the operating handle;

Fig. 4 is an exploded pictorial view showing the operating parts of the valve mechanism;

Fig. 5 is an exploded pictorial view showing some of the parts shown in Fig. 4, but showing their opposite sides;

Figure 12:
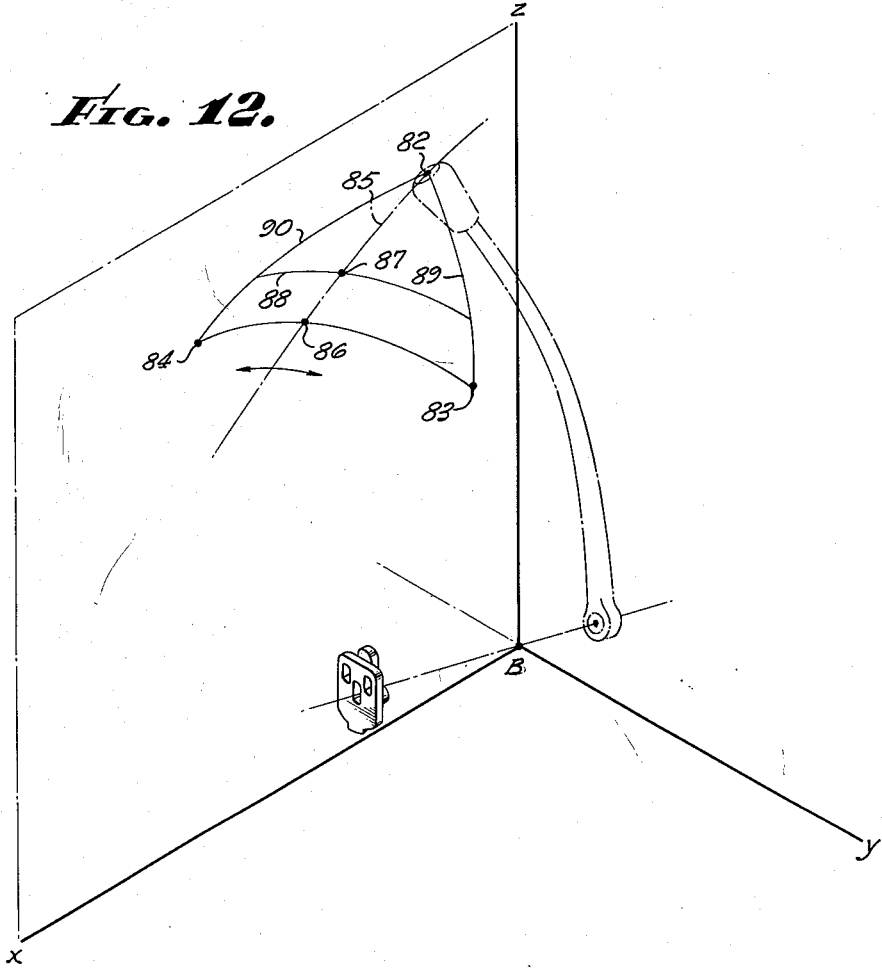
Figure 13:
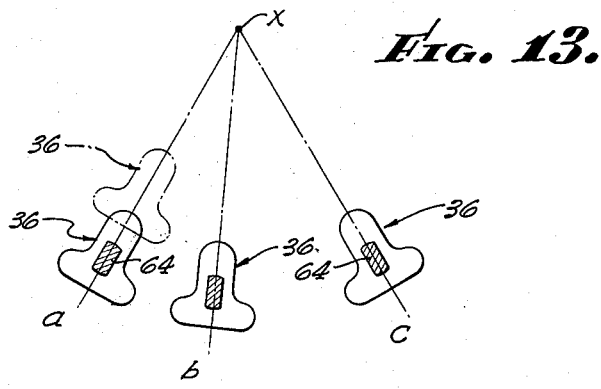

Figs. 6 and 7 are enlarged fragmentary sectional views taken along planes indicated by lines 6—6 and 7—7 of Fig. 2, respectively;

Figs. 8, 9, 10 and 11 are sectional views diagrammatically illustrating extreme positions of the valve; Fig. 8 illustrates one inlet fully open and the other inlet fully closed; Fig. 9 illustrates both inlets fully closed; Fig. 10 illustrates a position opposite that shown in Fig. 8, in which the other inlet alone is open; and Fig. 11 illustrates both inlets partially and equally open; and Figs. 12 and 13 are diagrammatic views illustrating the movement of the parts.

The faucet shown in Fig. 1 in this instance is designed for mounting at appropriately spaced holes in a sink or lavatory. In this embodiment of the invention, there are two main stationary parts, a valve body 9 and a fitting 10 supporting the valve body 9. Both parts may be made of cast brass or other suitable material. The fitting 10 provides depending threaded extensions 11 and 12 at opposite ends adapted to project through appropriate apertures in a wall, or in the sink or lavatory for cooperation with suitable supply conduits 13 and 14 for hot and cold water.

The fitting 10 provides two passages 15 and 16, each leading from the respective extensions 11, 12 to an elongate land 17 located centrally of the fitting at its uppermost portion. The ends of the passages 15 and 16 open upwardly at spaced portions of the land and are enlarged, as at 18 and 19, to accommodate resilient O-rings 20 and 21.

The valve body 9 has a mounting flange 22 providing on its lower side a flat surface 23 engaging the land 17. The flange 22 extends laterally from the bottom of a cup 28 (Fig. 3) which provides a valve chamber. This cup 28 is located at the rear of the faucet. Also located at the back of the cup 28 and upon the flange 22 is an upwardly extending nipple 32 (Fig. 3) forming an outlet from the valve chamber. A swing spout 33 is, in a conventional manner, secured to the nipple 32.

Cap screws 29 and 30 secure the flange 22 against the land 17.

An appropriate decorative cover (not shown) may enclose the fitting 10 and valve body 9. This cover may be clamped against the sink by the aid of a nut 34 mounted upon the nipple 32.

To conduct fluid from the fitting passages 15 and 16 to the valve chamber, appropriate passages are formed in the valve body 9. Thus, the flange 22 of the valve body 9 provides two downwardly opening recesses 24 and 25, respectively registering with the ends of the body passages 15 and 16. (See also Figs. 6 and 7.) The O-rings 20 and 21 engage the flat surface of the flange 22 and effect appropriate seals. Transverse passages 26 and 27 (Figs. 2, 6 and 7) respectively intersect the recesses 24 and 25 and open at the bottom of a cup 28 which forms a valve seat (see also Fig. 4).

The passages 26 and 27 (Figs. 8 to 11) are symmetrically disposed about the vertical diametric plane of the cup 28, but slightly beneath the horizontal diametric plane.

The openings of these passages 26 and 27 are controlled by a valve plate 36 accommodated within the cup 28. The valve plate 36, as shown in Fig. 5, has a flat sealing surface 37 cooperable with washers 38 and 39 (see also Figs. 6 and 7) located in enlarged ends of the passages 26 and 27. The valve plate 36 is appropriately finished, as by hard chromium plating. The washers 38 and 39 are spring-pressed outwardly by compression springs 40 and 41 located in the passages in order to effect appropriate engagement with the valve plate 36. The washers 38 and 39 provide appropriate interior shoulders for cooperation with the flattened end turns of the respective compression springs 40 and 41.

The surface 37 of the valve plate 36 is pressed against the bottom of the cup and thus against the exposed ends of the washers 38 and 39 by a centrally apertured thrust member 42 fitting within the cup 28 (Figs. 3 and 4). The thrust member 42 is made of molded nylon plastic or other wear-resisting material suitable for purposes to be hereinafter described.

Interrupted arcuate flanges 43 and 44 (Figs. 5 and 8 to 11), located peripherally at one end of the thrust member, engage the outer margin of the bottom of the cup and thus define with the corresponding end wall of member 42 generally a disk-shaped space of appropriate thickness to press the valve plate 36 against the seat. The valve plate 36 can, however, translate in the space and also move angularly about an axis normal to the seat.

An O-ring 46 (Figs. 3 and 4) carried upon the reduced outer end of the thrust member 42, engages about the outer edge of the cup 28 to establish a seal. The O-ring 46 and thrust member 42 are held in position by a centrally apertured cap 47. This cap has ears 48 registering with appropriately threaded lugs formed diametrically of the cup 28, and cap screws 49 (Figs. 1 and 6) secure the cap in place. Two pins 50 (Fig. 5), secured to the inside of the cap 47, enter recesses 51 in the outermost end of the thrust member 42 and hold the thrust member 42 against angular movement for purposes to be described more fully hereinafter.

To provide flow out of the inlet passages 26 and 27 and into the chamber formed by the cup, the valve plate 36 has two through control apertures 52 and 53 (Figs. 8 to 11) that selectively may register with the respective inlets 26 and 27. These control apertures or openings 52 and 53 are disposed on opposite sides of a plane of symmetry of plate 36, normal to the surface 37. The spacing between the control apertures 52 and 53 corresponds to the spacing between the inlet openings 26 and 27. Thus, assuming that the plane of symmetry of the valve plate member 36 coincides with the vertical diametric plane of the cup 28 (or the plane of symmetry about which the inlet openings 26 and 27 are located), translation of the valve plate 36, while this coplanar relationship is maintained, results in equal opening and closing of the inlet openings 26 and 27. This is indicated in Figs. 9 and 11.

In Fig. 9 the control apertures 52 and 53 are substantially out of registry with the inlet openings 26 and 27, the control openings respectively lying above the corresponding inlet openings. Sufficient area of the surface 37 of the valve plate is thus presented for appropriate operation of the washers 38 and 39.

In Fig. 11 the control openings 52 and 53 are each approximately fifty (50%) percent in registry with their corresponding inlet openings 26 and 27. In this position, counterclockwise rotation of the valve plate 36 about the axis $x$ of the cup 28, as viewed in Fig. 11, results in movement of the control opening 52 upwardly in a direction to reduce its registry with the inlet opening 26. But such rotation causes movement of the other control opening 53 downwardly in a direction to increase its registry with the inlet opening 27. This is illustrated in Fig. 8. Opposite rotation opens the inlet 27 and closes the inlet 26, as shown in Fig. 10. Furthermore, the extent of rotation of the valve plate 36 in one direction or the other, from the neutral position shown in Fig. 11, controls the relative extent of opening of the inlet ports 26 and 27. Rotation of the valve plate 36 in a counterclockwise direction reduces the temperature of the mixture, and opposite angular movement increases the temperature of the mixture.

Unrestricted flow of fluid to the outlet 31 (Figs. 8 to 11) when the outlet ports 26 and 27 are partially or entirely open is ensured by a recess 54 (Figs. 3 and 5) in the thrust member 42 which is located in alignment with the inlet openings 26 and 27. Fluids passing through the control openings 52 and 53 enter the recess 54 and pass outwardly therefrom through an upward extension 55 of the recess 54 which is joined to the recess 54 by a narrow neck. This upward extension 55 has an upper boundary located above the upper edge of the valve plate 36 when the valve plate 36 is moved downwardly to open the valve. As shown clearly in Figs. 8 to 11 and also in Fig. 3, the extension 55 is in alignment with the outlet port 31 whereby appropriate flow is achieved.

The extent of equal opening of the inlets 26 and 27 when the valve plate member 36 is in its extreme downward position (Fig. 11) is limited to approximately fifty (50%) percent. Otherwise, rotation of the valve plate 36 would close both inlets upon continued rotation of the valve plate. The lower wall 54a of the recess 54 limits this movement by cooperating with symmetrical arms 56 and 57 of an inverted T-shaped embossment 58 integrally formed on the rear portion of the valve plate 36.

The wall 54a extends arcuately about the axis $x$, and the recess 54 is formed as a sector. The arms 56 and 57 both engage the wall 54a as the valve plate 36 rotates about the axis $x$ since the center of curvature of the wall 54a falls at the axis $x$. The end radial walls 54b and 54c of the sector-shaped recess 54, by engagement respectively with the arms 56 and 57, determine the limits of arcuate movement of the valve plate 36. These limits correspond to positions shown in Figs. 8 and 10 and respectively to full opening of the inlet port 27 while the other inlet port 26 is closed, or full opening of the inlet port 26 and while the other inlet port 27 is closed.

Upward movement of the valve plate 36 must be sufficient to allow the washers 38 and 39 to engage the flat portions of the surface 37 of the valve plate 36 in order to ensure appropriate seals. The limit of upward movement of the valve plate 36 is determined by engagement of the end radial walls 54b and 54c with the arms 56 and 57 of the T-shaped embossment 58. This is illustrated in Fig. 9. Also defining this limit of upward movement is the upper end of the recess extension 55 which cooperates with the end 59 of the central leg of the T-shaped embossment.

In this closed position, the lower marginal portions 36a and 36b (Fig. 9) of the valve plate 36 extend slightly above the arcuate wall 54a of the recess 54. This occurs in this instance because the size of the cup 28 is desirably kept small, the wall 54a extending quite close to the outer margin of the cup. To ensure against tilting of the valve plate 36, the valve plate has a projection 60 (Figs. 4 and 5) between the lower surfaces 36a and 36b, the end of which never recedes beyond the arcuate wall 54a. Thus, the valve plate is adequately supported on the cup surface even in the extreme position of Fig. 9. Conveniently, this projection 60 enters the void between the arcuate flanges 43 and 44 when the valve plate is in the lower open position. The combined angular spacing between the projection 60 and the corresponding ends of the arcuate flanges 43 and 44 is substantially greater than the angular play of the valve plate 36. Thus, as illustrated in Figs. 8 and 10, the projection 60 always clears the ends of the arcuate projections 43 and 44 and does not interfere with appropriate operation of the valve.

Should the valve plate 36 be in a position intermediate that shown in Figs. 9 and 11 corresponding, for example, to a fifty (50%) percent combined opening and, say, a twenty-five (25%) percent opening of each of the inlets 26 and 27, rotation of the valve plate 36 about the axis x similarly results in a change in the relative openings of the inlets 26 and 27, depending upon the direction and extent of angular movement and without substantially changing the total combined flow through the valve. The end radial walls 54b and 54c similarly limit angular movement of the valve plate, and are so located that such complete closure of either one of the inlets can be effected while the other inlet is, say, fifty (50%) percent opened.

In the position shown in Fig. 8, the valve plate 36 can also be rotated in a clockwise direction about the axis x while the valve plate translates upwardly, thereby closing the inlet 27 without first moving the valve plate 36 to a position in which the inlet 26 is partially open. Also, at any intermediate position, a partial closure of the inlet 27 results in a corresponding reduction in total volume while the other inlet 26 may remain closed.

All combined modes of adjustment are possible; that is, the valve plate 36 can be moved downwardly while it is rotated about the axis x, and changes in proportion and total volume can be simultaneously and easily effected.

Desirably the valve plate 36 occupies one and only one position at the closed position so that there is a definite frame of reference for the valve for purposes outlined in the objects. When the valve plate is moved upwardly by applying a force at the plane of symmetry of the valve plate (as at the point 61, Fig. 9), the valve plate, by virtue of the convergence of the end radial walls 54b and 54c, tends to center, i.e., to assume that position in which the nose end 59 of the central leg is uppermost. However, the forces correcting against departure of the nose end 59 from its upper end position (corresponding to symmetrical orientation of the valve plate) are small since the angularity between the end radial walls 54b and 54c approaches 180°. To provide a more definite centralizing force, the walls 55a and 55b of the upper recess extension 55 symmetrically converge to a point 62. These converging walls more definitely cooperate with the nose 59 as the valve plate 36 is moved upwardly and, hence, a definite single position of the valve plate for the "off" position is ensured.

For moving the valve plate 36, a crank arm 63 (Figs. 3 and 4) is provided. One end 64 of the crank arm 63 is accommodated within a slot or socket 65 (Fig. 4) formed along the central leg of the T-shaped embossment 58. The center of the socket coincides with the point 61 heretofore identified as a point at the plane of symmetry of the valve plate 36 at which an upward force could be applied. This location of the socket provides particularly for the mode of operation discussed above. The end 64 of the crank arm 63 and the socket 65 are correspondingly noncircularly formed in order to effect a rotary drive connection between the crank arm 63 and the valve plate 36. In the present instance, the sides of the crank arm end 64 and the sides of the socket 65 are straight and parallel to each other, both sides being extended respectively in a direction parallel to the axis x. The crank arm end 64 projects through the central opening 67 of the thrust member 42 (Fig. 3), past the neck between the recess 54 and its extension 55, and into the socket 65.

The crank arm 63 is supported for limited universal movement by the aid of a ball 66 formed intermediate the ends of the crank arm 63. A ball socket for the ball 66 is provided by cooperating surfaces provided respectively by the thrust member 42 and the cap 47 at their central openings 67 and 68.

The opening 67 of the thrust member 42 is enlarged at its outer side to accommodate a seal to prevent passage of fluid about the ball 66 exteriorly through the opening 68 in the cap 47. The seal comprises a leather washer 69 in the form of a sleeve engaging the exterior of the ball 66. The washer 69 has a radial flange 70 at one end seated against the shoulder 71 formed by the enlargement of the thrust member opening 67. About the sleeve there is placed an O-ring 72 which engages both the thrust member opening 67, the washer 69 and the edge about the cap 47. Together the washer 69 and the O-ring 72 establish an effective seal. The axis x, heretofore identified, passes through the center of the ball 66.

To the outer or projecting end 73 of the crank arm 63 there is secured a handle 74 provided with a knob 75 at one end and a socket 76 at its other end. The projecting end 73 of the crank arm 63 is received in the socket 76 and the parts are appropriately splined or otherwise suitably formed to effect a definite connection. A retainer screw 77 passes through an aperture 78 into the bottom of the socket 76 and cooperates with an appropriate threaded aperture 79 in the projecting end 73. The screw 77 restrains separating movement between the socket 76 and the end 73.

The center of the ball 66, although falling along the axis x, is spaced (Fig. 3) rearwardly from the valve plate 36. This orientation permits the valve to be translated in a manner to be hereinafter described.

The side walls of the socket 65 and the side walls of the projection 64 locate the possible relative orientation between the crank arm 63 and the valve plate 36. This can be visualized clearly by considering for the moment the ball 66 unconfined, but the crank arm in engagement with the socket. It is clear that the center of the ball must be located in a specific plane relative to the valve plate. That plane is a plane parallel to the side walls of the socket 65. The crank arm is so formed as to be symmetrically disposed with respect to the center of the socket 65, which in turn is symmetrically disposed with respect to the valve plate. Hence, the center of the ball 66 must lie in the plane of symmetry of the valve plate. Or stated alternately, since the center of the ball 66 is fixed, the plane of symmetry of the valve plate 36 must include the center of the ball 66.

Since the valve plate 36 is confined against tilting and since, in this instance, the side walls of the socket 65 are normal to the seat, the plane of symmetry of the valve plate must always be perpendicular to the seat. The only planes normal to the seat which also pass through the center of the ball 66 are those planes which extend radially about an axis formed by a line perpendicular to the seat passing through the center of the ball 66. This line, in this instance, corresponds to the axis x.

In Fig. 13 there are illustrated several orientatoins of the plane of symmetry of the valve plate that are possible.

The axis of crank arm 63, by virtue of the foregoing considerations, always lies in the plane of symmetry of the valve plate 36. Thus, the axis of the crank 63 is always oriented in planes including the axis x.

Despite this, the axis of the crank 63 can move angularly about an axis normal to the plane of symmetry and passing through the center of the ball 66. Such angular movement of the crank 63 causes the valve plate 36 to translate, for example, along the path a in Fig. 13, as indicated by the alternative positions of valve plate 36.

In order to ensure an operative connection between the crank arm end 64 and the socket 65 for this purpose, the upper and lower ends of the crank arm fit the upper and lower ends of the socket 65. However, the upper and lower ends of the crank arm end 64 are rounded to provide an edge contact with the upper and lower walls of the socket, thereby preventing binding between the parts as the axis of the crank arm so rotates.

In order to ensure perfect engagement of the parts despite tilting about such axes, the rounded ends correspond to arcs of a common cylinder, the diameter of which corresponds to the spacing between the upper and lower ends of the socket.

Angular movement of the crank arm 63 about the axis x acts through the straight side walls of the socket to rotate the valve plate to orientations, such as a, b, or c, as shown in Fig. 13.

The knob 75 is, of course, fixed with respect to the crank arm 63 and its axis. Thus, by locating the centerline of knob 75 in the plane of symmetry of the valve plate 36, generally sidewise movement of the knob 75, or more accurately, rotation thereof about the axis x imparts corresponding rotation to the crank arm 63 about that axis, and hence corresponding rotation to the valve plate 36. This is indicated by the double-headed arrow 81 (Fig. 2). Similarly, rotation of the knob 75 about an axis normal to the plane of symmetry imparts radial movement to the crank arm end 64 and corresponding movement to the valve plate 36. This is indicated by the double-headed arrow 80 (Figs. 1 and 3).

The upper end of handle 74 is movable within a generally triangular path shown in Fig. 12. The symmetrical apex 82 of this path corresponds to the "off" position of the valve, and the other two apices 83 and 84 correspond respectively to full opening of the inlet 26, as shown in Fig. 10, and full opening of the inlet 27, as shown in Fig. 8. Except for a small area near the apex 82, every position of the knob 75 within this triangular path corresponds to a definite ratio of opening of the respective inlets 26 and 27 and a definite combined flow. Thus, the angular position of the knob 75 about the x axis determines the angular orientation of the symmetry plane of the valve plate (corresponding to proportion) and the angular position of the knob 75 about an axis normal to the plane of symmetry and passing through the ball 66 determines the radial position of the valve plate 36 (corresponding to flow).

The reason why the knob 75 moves in a triangular path can be recognized by careful observation of the geometric relationships of the elements. Up and down movement of the valve plate 36 between the positions shown in Figs. 9 and 11 corresponds to movement of the knob 75 along the path indicated by line 85 in Fig. 12. This line is, of course, located in the plane of symmetry, which in this instance corresponds to the vertical plane of symmetry of the cup 28 illustrated in Fig. 12, as the plane x—z. The origin of the coordinate system shown in Fig. 12 corresponds to the center of ball 66.

Assuming the knob is at the point 86 corresponding to the position shown in Fig. 11, a substantial tilting of the plane of symmetry of the valve plate 36 about the fixed axis x (i.e., corresponding to rotation of the valve plate) is permitted as determined by the end radial walls 54b and 54c. Since the knob 75 is in the plane of symmetry, it also moves arcuately between the points 83 and 84. This movement of knob 75 is along an arc indicated by arrow 81 in Fig. 2.

Should the valve plate 36 be located upwardly so that its arms 56 and 57 are spaced from the arcuate wall 54a of the recess 54, the angular tilting of the plane of symmetry of the valve plate 36 about the x axis or axis of the valve is reduced in proportion to the extent that the arms 56 and 57 are elevated. This follows since, upon upward movement of the valve plate 36, the arms 56 and 57 move closer to the x axis and thus now subtend a greater angle with respect to the x axis, while the limiting end radial walls 54b and 54c maintain a constant angle with respect to the x axis. Hence, the angular movement or tilting is reduced. Thus, if the knob is at a point 87 (Fig. 12), for example, the angular movement (corresponding to the line 88) permitted is reduced. The knob 75 is thus movable within a triangular path, since its possible sidewise movement decreases in accordance with its angular position about the y axis.

When the permitted angular movement along path 88 of the valve plate 36 is reduced, the degree of registry of the control openings 52 and 53 is also reduced. Hence, the reduced angular movement of the knob 75, as indicated by the line 88, is nevertheless sufficient to cause full closure of one of the openings 26 or 27.

The position of the knob 75, as explained hereinabove, determines precisely the orientation of the valve plate. This is true providing the plane of symmetry of the valve plate 36 passes precisely through the x axis. If the plane of symmetry is permitted to pass slightly on opposite sides of the x axis, a translation of the valve plate 36 in the sidewise direction, as viewed in Figs. 8 to 11, will be permitted. This, of course, introduces an uncontrolled variable between the knob 75 and the plate 36.

The precision of fit between the sides of the crank end 64 and the side walls of the socket 65, the length of these parts in a direction parallel to the x axis, the distance of the ball measured along the x axis from these parts, and the precision of fit of the valve plate 36 in the space between the seat and the thrust member 42 all determine the possible angular deviation of the crank arm axis away from a plane normal to the seat. Since a running clearance must be provided between the parts, departure of the axis of the crank arm 63 from a plane normal to the seat will depend primarily upon the dimension in a direction parallel to the x axis of the side walls of the socket and the sides of the crank arm and also upon the distance between the center of the ball 66 from these parts.

Axially lengthening the socket 65 and spacing the ball 66 rearwardly are impractical from the standpoint of compactness. However, by maintaining reasonable tolerances of parts, the sidewise shift of the valve plate 36 is held to narrow limits even for the proportions of the parts illustrated. However, the arcuate configuration of the lower wall 54a of the recess 54 prevents material departure of the plane of symmetry from a radial relationship when the valve is fully opened. This results since the center of curvature of the wall 54a is, in fact, the x axis. Also, the converging sides 55a and 55b of the recess extension 55 determine this radial relationship when the valve plate is at a closed position.

Adjustment of the valve is facilitated and made non-critical by ensuring that the distance between the points 83 and 84 corresponding respectively to full opening movements of the alternate inlets 26 and 27 is made large. Also to this end, the path 85 between the closed position of the valve (Fig. 9) and the full equal opening position is made large. To accomplish these purposes, the recess 54 and the arms 56 and 57 are appropriately proportioned. Most desirably, the triangular boundary of the path of movement of the knob 75 is generally in the form of an equiangular triangle.

Positioning the knob 75 anywhere within the triangular boundaries is easily accomplished and any desired point can be reached by a simple direct movement of the knob 75. A compound movement is not necessary.

For example, the knob can readily be moved along the side legs 89 and 90 of the triangular boundary in either direction. If the knob 75 is moved upwardly along the path, for example, from the point 84 (corresponding to Fig. 10), the valve plate 36 rotates about the axis x while the plate 36 moves upwardly. The arm 56 forms a fulcrum point that translates upwardly along the end radial wall 54b during the course of this movement. The knob 75 can similarly move in any direct path to effect prompt, accurate adjustment of the valve.

The inventor claims:

1. In a mixing valve: means forming a chamber having an outlet; means forming a valve seat in the chamber, and having two ports; a valve plate in the chamber and having passage means registrable with the ports; and an operator projecting into the chamber and connected to the plate for moving the plate; means confining the plate for movement so that a plane fixed with respect to the valve plate and extending normal to the seat always passes through an axis normal to and fixed with respect to said valve seat; the plate being rotatable about said axis for adjusting the relative registry of the passage means with said ports, and slidable radially of said axis to adjust the extent of combined registry of the passage means with said ports.

2. In a valve structure: means forming a seat; a pair of inlet forming means opening in the seat; a valve plate member confined against the seat and having flow controlling means cooperable with the inlet forming means; an arm member supported for universal-type movement about a center spaced from but fixed with respect to the seat; said members having companion connecting means confining the valve plate for movement such that a plane fixed with respect to the valve plate member always includes said center; said arm member being angularly adjustable about a first axis located in any plane normal to said seat passing through said center for moving the valve plate in one direction angularly about said first axis; said arm also being angularly adjustable about axes normal to said fixed plane and passing through said center for moving the valve plate in another direction; said inlet forming means and said flow controlling means being so located as to cause adjustment of the total volume and adjustment of the proportions of opening of the inlet means respectively upon movement of said valve plate in said directions.

3. In a valve structure: means forming a seat; a pair of inlet forming means opening in the seat; a valve plate member confined against the seat and having flow controlling means cooperable with the inlet forming means; an arm member supported for universal-type movement about a center spaced from but fixed with respect to the seat; said members having companion connecting means confining the valve plate member for movement such that a plane fixed with respect to the valve plate member and normal to said seat always passes through said center; said arm and said valve plate member being angularly adjustable about a first axis normal to said seat and passing through said center for adjusting the angular position of said valve plate about said axis; said arm also being angularly adjustable about second axes normal to said fixed plane and passing through said center for moving said valve plate in a direction toward and away from said first axis; said inlet forming means and said flow controlling means being so located as to cause adjustment of the total volume and adjustment of the proportions of opening of the inlet means respectively upon movement of said valve plate in said directions.

4. In a mixer valve structure: a valve body having an outlet extension and a valve chamber; said valve chamber having a surface forming a seat extending generally parallel to the axis of said extension; means forming a pair of inlet passages opening in said seat; a valve plate continuously engaging the seat; an arm supported for universal-type movement about a center spaced from the seat; a connection between the valve plate and the arm whereby the valve plate is rotatable only about an axis normal to said seat and passing through said center, said connection having means permitting tilting movement of the arm about axes lying in a plane parallel to said seat and passing through said center for moving the valve plate in a direction radially of said rotational axis; and means limiting movement of the valve plate and defining a substantially triangular boundary for the possible positions of the arm, one apex of the boundary corresponding to closed position of the valve, the other apices respectively corresponding to full opening of one of the inlet passages while the other inlet passage is closed and full opening movement of the other of said inlet passages while the said one inlet passage is closed.

5. In a mixer valve structure: a valve body having an outlet extension and a valve chamber; said valve chamber having a surface forming a seat extending generally parallel to the axis of said extension; means forming a pair of inlet passages opening in said seat; a valve plate continuously engaging the seat; a handle end supported for universal-type movement about a center spaced from the seat; a connection between the valve plate and the handle end whereby the valve plate is rotatable only about an axis normal to said seat and passing through said center, said connection having means permitting tilting movement of the handle end about axes lying in a plane parallel to said seat and passing through said center for moving the valve plate in a direction radially of said rotational axis; and means limiting movement of the valve plate and defining a substantially triangular boundary for the possible positions of the handle end, one apex of the boundary corresponding to closed position of the valve, the other apices respectively corresponding to full opening of one of the inlet passages while the other inlet passage is closed and full opening movement of the other of said inlet passages while the said one inlet passage is closed.

6. In a valve structure: means forming a valve chamber having an outlet and two inlets opening in a seat; a valve plate member engageable with the seat; thrust means fixed relative to the chamber and confining the valve plate member against the seat, but permitting movement of said valve plate member along the seat; said valve member having passage means cooperating with said inlets; a lever member projecting into the chamber through the thrust means; said thrust means having provisions supporting the lever member for universal-type movement about a center; a connection between the lever and the valve plate for confining the valve plate for rotation only about an axis normal to the seat and passing through said center; said connection permitting tilting movement of the lever member with respect to said axis for shifting the valve plate member in a direction radially of said axis; and seals preventing passage of fluid about the thrust means and past the lever member.

7. In a valve structure: means forming a valve seat; means forming a pair of inlet passages opening in the seat; a valve plate having flow control means cooperable with said openings; means confining the valve plate to only two modes of movement, corresponding to angular movement thereof about an axis located substantially symmetrically of the openings of said inlet passages, and to movement of said valve plate in a direction substantially radially of said axis; said valve plate being movable to a position in which said flow control means is symmetrically oriented with respect to said inlet openings; means limiting movement of said valve plate in said direction for limiting the registry of said control means with said inlet openings when said valve plate is in said position to approximately fifty percent whereby upon angular movement of the valve plate, the registry of said flow control means with one of said openings increases, while its registry with the other of said openings decreases; means cooperable with said valve seat forming means for defining a chamber receiving fluid from said inlet passages; means forming an outlet passage from said chamber; and means for moving the valve plate.

8. In a valve structure: means forming a valve seat; means forming a pair of inlet passages opening in the seat; a valve plate having flow control means cooperable with said openings; means confining the valve plate to only two modes of movement, corresponding to angular movement thereof about an axis located substantially symmetrically of the openings of said inlet passages, and to movement of said valve plate in a direction substantially radially of said axis; said valve plate being movable to a position in which said flow control means is symmetrically oriented with respect to said inlet openings; means limiting movement of said valve plate in said direction for limiting the registry of said control means with said inlet openings when said valve plate is in said position to approximately fifty percent whereby upon angular movement of the valve plate, the registry of said flow control means with one of said openings increases, while its registry with the other of said openings decreases; means limiting angular movement of said flow control means away from said position and respectively corresponding to full closure of the respective openings; means cooperable with said valve seat forming means for defining a chamber receiving fluid from said inlet passages; means forming an outlet passage from said chamber; and means for moving the valve plate.

9. In a valve structure: means forming a valve seat; means forming a pair of inlet passages opening in the seat; a valve plate having flow control means cooperable with said openings; means confining the valve plate to only two modes of movement, corresponding to angular movement thereof about an axis located substantially symmetrically of the openings of said inlet passages, and to movement of said valve plate in a direction substantially radially of said axis; means substantially uniformly limiting movement of said valve plate away from said axis; means limiting angular movement of said valve plate in proportion to the distance of said valve plate from said axis; means cooperable with said valve seat forming means for defining a chamber receiving fluid from said inlet passages; means forming an outlet passage from said chamber; and means for moving the valve plate.

10. In a valve structure: means defining a chamber having a valve seat; means forming a pair of inlet passages having openings at the seat; means forming an outlet from the chamber; a valve plate having flow control means cooperable with said openings; means confining the valve plate to only two modes of movement, corresponding to angular movement thereof about an axis located substantially symmetrically of the openings of said inlet passages, and to movement of said valve plate in a direction substantially radially of said axis; means confining the valve plate for movement within a substantially sector-shaped boundary and means for moving the valve plate.

11. In a valve structure: means defining a chamber having a valve seat; means forming a pair of inlet passages having openings at the seat; means forming an outlet from the chamber; a valve plate having flow control means cooperable with said openings; a thrust member confining the valve plate against the seat; said thrust member having walls forming a substantially sector or triangularly shaped space; said valve plate having following means cooperable with the walls whereby the plate is limited to movement within a substantially sector or triangularly shaped boundary; and means for moving the valve plate angularly about the apex of said recess and radially from said apex.

12. In a valve structure: means forming a valve seat; means forming a pair of inlet passages opening in the seat; a valve plate having apertures cooperable with said openings; a thrust member confining the valve plate against the seat; said thrust member having walls forming a substantially sector or triangularly shaped space; said valve plate having following means cooperable with the walls whereby the plate is limited to movement within a substantially sector or triangularly shaped boundary; means for moving the valve plate angularly about the apex of said recess and radially from said apex; said recess being located in alignment with said openings for receiving fluids passing through said valve plate; and means forming an outlet in communication with said recess.

13. In a valve structure: means forming a valve chamber having a seat; means forming a pair of inlet passages opening in the seat; a valve plate having flow controlling means cooperable with said openings; means forming an outlet at the seat spaced from said openings; thrust means confining the valve plate against the seat; said thrust means having walls forming a substantially sector or triangularly shaped space aligned with the inlet openings; said valve plate having following means cooperable with the walls whereby the plate is limited for movement within a substantially sector or triangularly shaped boundary; said recess having an extension aligned with said outlet and registering therewith when the valve plate is in any valve opening position; and means for moving the valve plate angularly about the apex of said recess and radially away from said apex.

14. In a valve structure: means forming a valve chamber having a seat; means forming a pair of inlet passages having openings at the seat; means forming an outlet from the chamber; a valve plate having flow controlling means cooperable with said openings; thrust means confining the valve plate against the seat; said thrust means having walls forming a substantially sector or triangularly shaped space; said valve plate having first following means cooperable with the walls whereby the plate is limited for movement within a substantially sector or triangularly shaped boundary; said recess having an extension provided with side walls converging to a point; said valve plate having second following means cooperable with said converging walls; said converging walls being so located that said second following means engages the walls at said point when said first following means is at said apex whereby the valve plate is specifically angularly oriented when at said apex; and means for moving the valve plate.

15. In a valve structure: means forming a valve chamber having a seat; means forming a pair of inlet passages having openings at the seat; means forming an outlet from the chamber; a valve plate having flow controlling means cooperable with said openings; thrust means confining the valve plate against the seat; said thrust means having walls forming a substantially sector or triangularly shaped recess; said valve plate having first following means cooperable with the walls whereby the plate is limited for movement within a substantially sector or triangularly shaped boundary; said recess having an extension provided with side walls converging to a point; said valve plate having second following means cooperable with said converging walls; said converging walls being so located that said second following means engages the walls at said point when said first following means is at said apex whereby the valve plate is specifically angularly oriented when at said apex; an arm for moving the valve plate; and means supporting the arm for universal-type movement about a center spaced from the valve plate; said arm and said valve plate having engaging parts confining angular movement of the valve plate only about an axis formed by a line passing through said center and normal to said seat; said axis passing through said apex; said engaging parts permitting angular movement of the arm for moving the valve plate in a direction radially toward and away from said axis.

16. In a valve structure: means forming a valve chamber having a seat; means forming a pair of inlet passages having openings at the seat; means forming an outlet from the chamber; a valve plate having flow controlling means cooperable with said openings; thrust means confining the valve plate against the seat; said thrust means having walls forming a substantially sector or triangularly shaped space; said valve plate having a crank arm supported for universal-type movement about a center spaced from but fixed with respect to the seat; said valve plate and said arm having companion connecting means confining movement of the valve plate such that a plane fixed with respect to the valve plate always passes through said center; said arm and said valve plate being angularly adjustable about an axis passing through said center and normal to said seat for moving the valve plate angularly about said axis, said axis passing through the apex of said sector or triangularly shaped space; said crank arm also being angularly adjustable about an axis normal to said fixed plane and passing through said center for moving the valve plate in a direction radially toward and away from said apex; said inlet forming means and said flow controlling means being so located as to cause adjustment of the volume and adjustment of the proportions upon movement of said valve plate radially and angularly with respect to said apex.

17. In a valve structure: a cup providing a flat seat and having two inlet openings in its seat, as well as an outlet opening; a substantially flat valve plate having flow controlling means cooperable with said inlets; a thrust member having a pair of arcuate projections fitting within the cup and defining a substantially disk-shaped space in which the valve plate is confined; said thrust member having a substantially sector-shaped recess exposed to the valve plate and extending close to the outer radial boundary of the cup between the arcuate projections; said valve plate having a rearward projection accommodated in said recess and determining a substantially sector-shaped boundary within which the valve plate may be positioned; the parts being so proportioned that the sides of the valve plate extend beyond the end radial walls of the recess at all positions; said valve plate having a projection extending radially beyond the arcuate wall of the recess at all positions to prevent tilting movement of the valve plate; an arm supported by the thrust member for universal-type movement about a center spaced from the seat; and connecting means between the arm and the valve plate for positioning the valve plate in accordance with the position of the arm.

18. In a valve structure: means forming a valve seat; a movable valve member confined against the seat; a lever member; and means supporting the lever member for universal-type movement about a center fixed with respect to the seat; one of said members providing a socket and the other of said members providing a projection engaged within the socket; the socket and the projection having side portions in engagement throughout a finite length along the socket, thereby locating a plane fixed with respect to the valve member so that it always passes through said center; the socket and the projection having engaging end portions permitting relative tilting movement of said lever in a direction parallel to said fixed plane.

19. In a mixing valve: means forming a chamber having an outlet; means forming a valve seat in the chamber, and having two ports; a valve plate in the chamber and having passage means registrable with the ports; an operator projecting into the chamber and connected to the plate for moving the plate; means confining the plate for movement so that a plane fixed with respect to the valve plate and extending normal to the seat always passes through an axis normal to and fixed with respect to said valve seat; the plate being rotatable about said axis for adjusting the relative registry of the passage means with said ports, and slidable radially of said axis to adjust the extent of combined registry of the passage means with said ports; and means imposing limits on the translation and rotation of said valve plate.

20. In a mixing valve: a valve body having an outlet extension; a spout secured to the extension and adapted to project on one side of the valve body; said valve body having a chamber opening on the opposite side of the valve body and communicating with said extension; means forming a valve seat in said chamber and having two inlet ports opening into said chamber; a valve plate in the chamber and having passage means registrable with the ports; an operator projecting into the chamber and mounted on said other side of said valve body for moving said valve plate to adjust the relative registry of said passage means with the ports as well as for adjusting the extent of combined registry of the passage means with said ports; a handle secured to the operator and projecting beyond the place of attachment of the spout to the extension; means closing the chamber; and means confining the operator for movement within substantially a triangular path and so that the handle is maintained substantially in alignment with said extension.

21. In a valve structure: means forming a valve chamber and a valve seat in said chamber; means forming a pair of inlet passages opening in the seat; a valve plate having flow-controlling means cooperable with the openings of said inlet passages; means forming an outlet from said chamber; a thrust member fitting within the chamber and having one side opposed to the seat and engaging the valve plate for confining the valve plate against the seat; said thrust means having a through opening, there being an internal flange provided about said opening of said thrust means; an operator for moving said valve plate and extending through said opening in said thrust means; said operator having a ball seated at the inner margin of said flange; a flexible sleeve-like sealing ring in the opening and having a radially outwardly projecting flange engaging the flange of said thrust member, the ring extending along said ball; an O-ring in encompassing relationship to said sealing ring and urging said sealing ring against said ball; and a cap secured to said chamber forming means and having provisions for urging said ball against said flange and for maintaining said O-ring and sealing ring in place.

22. In a valve structure: means forming a seat; a pair of inlet forming means opening in the seat; a valve plate member confined against the seat and having flow-controlling means cooperable with the inlet forming means; an arm member supported for universal-type movement about a center spaced from but fixed with respect to the seat; said members having companion connecting means confining the valve plate for movement such that a plane fixed with respect to the valve plate member always includes said center; said arm member being angularly adjustable about a first axis located in any plane normal to said seat passing through said center for moving the valve plate in one direction angularly about said first axis; said arm also being angularly adjustable about axes normal to said fixed plane and passing through said center for moving the valve plate in another direction; said inlet forming means and said flow-controlling means being so located as to cause adjustment of the total volume and adjustment of the proportions of opening of the inlet means respectively upon movement of said valve plate in said directions; means imposing substantially triangular limits upon the movement of said arm member.

23. In a mixing faucet, a valve body having a recess and an internal wall, a cold water inlet, and a hot water inlet both extending through said internal wall, a valve plate member of substantially less area than said recess containing a centrally arranged slot and a pair of spaced offset ports each adapted to cooperate with one of said inlets to control flow, means for maintaining said valve member in continuous surface and sealing contact with said internal wall, a hollow closure for said valve body and providing with said recess a mixing chamber, a universal mounting in said closure, a shaft affixed at one end to the mounting and having its other end projecting into said slot, a handle attached to the mounting and having an upstanding part movable in a plane formed by said upstanding part and said shaft, to transmit a reciprocating motion to said valve member whereby said inlets are brought into volume controlling registration with their respective valve member ports, said upstanding part being movable laterally in a plane normal to said first plane to transmit a rotary motion to said valve member whereby said inlets are brought into a desired mixture controlling registration with their respective valve member ports, and means limiting the arc of rotation of said mounting.

References Cited in the file of this patent

UNITED STATES PATENTS

| | | |
|---|---|---|
| 1,790,168 | Paul | Jan. 27, 1931 |
| 2,503,881 | Manis | Apr. 11, 1950 |